United States Patent
Sawada et al.

(10) Patent No.: US 10,180,667 B2
(45) Date of Patent: Jan. 15, 2019

(54) CONTROLLER-EQUIPPED MACHINING APPARATUS HAVING MACHINING TIME MEASUREMENT FUNCTION AND ON-MACHINE MEASUREMENT FUNCTION

(71) Applicant: FANUC Corporation, Yamanashi (JP)

(72) Inventors: Takeshi Sawada, Yamanashi (JP); Weibo Li, Yamanashi (JP); Kunitaka Komaki, Yamanashi (JP); Yuuki Kurokawa, Yamanashi (JP); Shinji Akimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 193 days.

(21) Appl. No.: 15/223,008

(22) Filed: Jul. 29, 2016

(65) Prior Publication Data
US 2017/0031328 A1    Feb. 2, 2017

(30) Foreign Application Priority Data

Jul. 30, 2015    (JP) .................................. 2015-150341

(51) Int. Cl.
*G06F 19/00* (2018.01)
*G05B 13/02* (2006.01)
(Continued)

(52) U.S. Cl.
CPC .......... *G05B 13/028* (2013.01); *G05B 19/401* (2013.01); *G05B 19/404* (2013.01);
(Continued)

(58) Field of Classification Search
CPC ............................................... G05B 19/41875
(Continued)

(56) References Cited

U.S. PATENT DOCUMENTS 5,473,532 A * 12/1995 Unno ............... G05B 19/40937
700/254
5,815,400 A * 9/1998 Hirai .................... G05B 19/401
700/173
(Continued)

FOREIGN PATENT DOCUMENTS

JP    4-138504 A    5/1992
JP    4-348818 A    12/1992
(Continued)

OTHER PUBLICATIONS

Koji Iwamura et al, "Applying Multi-Agent Reinforcement Learning to Autonomous Distribution Type Real Time Scheduling", Transactions of the Institute of Systems, Control and Information Engineer, vol. 26 (2013) No. 4, pp. 129-137, Kyoto, Japan, for which English abstract is attached.
(Continued)

*Primary Examiner* — Suresh Suryawanishi
(74) *Attorney, Agent, or Firm* — Hauptman Ham, LLP

(57) ABSTRACT

A machining apparatus is provided with a machine learning device that performs machine learning. The machine learning device performs the machine learning by receiving the input of machining accuracy between a machining shape of a workpiece measured on-machine and design data on the workpiece and machining time of the workpiece measured by a measurement device. Based on a result of the machine learning, the machining apparatus changes machining conditions such that the machining accuracy increases and the machining time becomes as short as possible.

7 Claims, 3 Drawing Sheets

(51) Int. Cl.
*G05B 19/401* (2006.01)
*G05B 19/4063* (2006.01)
*G05B 19/404* (2006.01)

(52) U.S. Cl.
CPC ............... *G05B 19/4063* (2013.01); *G05B 2219/33056* (2013.01); *G05B 2219/33322* (2013.01); *G05B 2219/37336* (2013.01); *G05B 2219/37617* (2013.01); *G05B 2219/39076* (2013.01); *G05B 2219/49205* (2013.01); *Y02P 90/265* (2015.11)

(58) Field of Classification Search
USPC .......................................................... 700/109
See application file for complete search history.

(56) References Cited

U.S. PATENT DOCUMENTS

| | | | |
|---|---|---|---|
| 6,512,961 B1 | 1/2003 | Fukaya et al. | |
| 8,729,420 B2* | 5/2014 | Kudou | B23H 1/024 219/69.13 |
| 9,235,205 B2* | 1/2016 | Prestidge | G05B 19/401 |
| 2001/0027354 A1 | 10/2001 | Kakino et al. | |
| 2003/0163208 A1 | 8/2003 | Sugiyama et al. | |
| 2005/0256605 A1 | 11/2005 | Maeda et al. | |
| 2007/0517101 | 3/2007 | Ogata et al. | |
| 2009/0098515 A1* | 4/2009 | Das | G09B 19/18 434/107 |
| 2009/0099985 A1* | 4/2009 | Tesauro | G05B 13/0265 706/12 |
| 2011/0246115 A1* | 10/2011 | Hon | G01B 5/008 702/95 |
| 2011/0284512 A1 | 11/2011 | Stork Genannt Wersborg | |
| 2013/0122885 A1 | 5/2013 | Kojima | |
| 2016/0243663 A1* | 8/2016 | Kume | B23Q 17/20 |

FOREIGN PATENT DOCUMENTS

| | | |
|---|---|---|
| JP | 5-104395 A | 4/1993 |
| JP | 10-76444 A | 3/1998 |
| JP | 10-296590 A | 11/1998 |
| JP | 2001-255921 A | 9/2001 |
| JP | 2003-256009 A | 9/2003 |
| JP | 2005-63057 A | 3/2005 |
| JP | 2005-327191 A | 11/2005 |
| JP | 2007-69330 A | 3/2007 |
| JP | 2012-509190 A | 4/2012 |
| JP | 2012-196715 A | 10/2012 |
| JP | 2013-106202 A | 5/2013 |
| JP | 2014-228972 A | 12/2014 |
| WO | 00/10769 A1 | 3/2000 |

OTHER PUBLICATIONS

Office Action in JP Application No. 2015-150341, dated Oct. 18, 2016.
Office Action in JP Application No. 2015-150341, dated Aug. 15, 2017, pp. 10.
Office Action in JP Application No. 2015-150341, dated Mar. 14, 2017.

* cited by examiner

CONTROLLER-EQUIPPED MACHINING APPARATUS HAVING MACHINING TIME MEASUREMENT FUNCTION AND ON-MACHINE MEASUREMENT FUNCTION

RELATED APPLICATIONS

The present application claims priority to Japanese Patent Application Number 2015-150341, filed Jul. 30, 2015, the disclosure of which is hereby incorporated by reference herein in its entirety.

BACKGROUND OF THE INVENTION

1. Field of the Invention

The present invention relates to a controller-equipped machining apparatus having a machining time measurement function and an on-machine measurement function.

2. Description of the Related Art

In conventional machining of a workpiece, a machining program is created and a machining apparatus is controlled based on this machining program to machine the workpiece. In the machining of a workpiece with a machining apparatus, an operator adjusts machining conditions such that the time taken for the machining can be shortened while maintaining machining accuracy at a prescribed level or higher. However, optimum values of machining conditions vary depending on the characteristics of tools, characteristics of a workpiece, contents of machining, type of a machining apparatus, etc., and therefore every time an operator newly performs machining, he/she has to expend efforts to adjust the machining conditions by trial and error, exploiting knowledge and experience.

As a related art associated with such an adjustment of machining conditions, WO 00/010769 discloses an invention in which machining conditions in past machining operations are compiled into a database to be used for the purpose of assisting an operator.

With this publicly known art, efforts made to adjust machining conditions in one situation can be reduced to a certain degree, because of the possibility to reuse machining conditions in other similar situations; however, even after reading past machining conditions from the database, the operator still needs to repeat trial and error in order to adjust the past machining conditions so as to suit a current machining situation, and therefore this publicly known art does not completely eliminate the efforts of the operator.

SUMMARY OF THE INVENTION

In view of the above circumstances, the present invention has an object of providing a controller-equipped machining apparatus having a machining time measurement function and an on-machine measurement function that allows calculation of appropriate machining conditions to suit a change in a machining situation.

According to an embodiment of the present invention, there is provided a machining apparatus including: an on-machine measurement section that measures a machining shape of a workpiece on-machine; a machining time measurement section that measures machining time of the workpiece; and a machine learning device that performs machine learning by receiving inputs of the machining time and machining accuracy between the machining shape and design data on the workpiece serving as inputs. The machine learning device is configured to change a machining condition based on a result of the machine learning such that the machining accuracy increases and the machining time becomes as short as possible.

The machine learning device may perform the machine learning in such a way that a positive reward is given when the machining apparatus machines the workpiece such that an error between the machining shape and the design data on the workpiece is reduced or when the machining time is reduced and a negative reward is given when the machining apparatus machines the workpiece such that the error between the machining shape and the design data on the workpiece is increased or when the machining time is increased.

The machine learning device may be configured to perform, in the machine learning, weighting to indicate which of reduction in an error between the machining shape and the design data on the workpiece and reduction in the machining time is to be emphasized.

The machining apparatus may be capable of being connected to at least one another machining apparatus and mutually exchange or share the result of the machine learning with the other machining apparatus.

According to another embodiment of the present invention, there is provided a machine learning device that has performed machine learning of an adjustment of a machining condition in machining of a workpiece by a machining apparatus, the machine learning device including: a learning result storage section that stores a result of the machine learning of the adjustment of the machining condition; a state observation section that acquires state data including at least machining time, machining accuracy of the workpiece, and the machining condition in the machining of the workpiece by the machining apparatus; a machining condition adjustment learning section that adjusts the machining condition based on the result of the machine learning of the adjustment of the machining condition and the state data acquired by the state observation section; and a machining condition output section that outputs the machining condition adjusted by the machining condition adjustment learning section.

According to a controller-equipped machining apparatus having a machining time measurement function and an on-machine measurement function of an embodiment of the present invention, it becomes possible to calculate appropriate machining conditions, by which machining may be performed in a shorter period of time while maintaining machining accuracy to suit a machining condition, by the introduction of machine learning into the controller-equipped machining apparatus.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

In an embodiment of the present invention, a machine learning device acting as artificial intelligence is introduced into a machining apparatus that machines a workpiece to perform machine learning about the adjustment of machining conditions for machining the workpiece, whereby the automatic calculation of optimum machining conditions for machining the workpiece is made possible. In the adjustment of the machining conditions, shorter machining time and the maintenance of machining accuracy are targeted.

(1) Machine Learning

In general, machine learning is classified into various algorithms such as supervised learning and unsupervised learning according to its target or conditions. The present invention has an object of learning the adjustment of machining conditions set in a machining apparatus that machines a workpiece. In consideration of the fact that it is hard to explicitly indicate what type of action (adjustment of a feed speed, a main-shaft revolution speed, table feed, feed per tooth, or the like) may be appropriately performed with respect to measured machining time and machining accuracy after the machining by the machining apparatus based on the set machining conditions, a reinforcement learning algorithm in which the machine learning device automatically learns an action for achieving an object only with the acceptance of a reward is employed.

Figure 1:
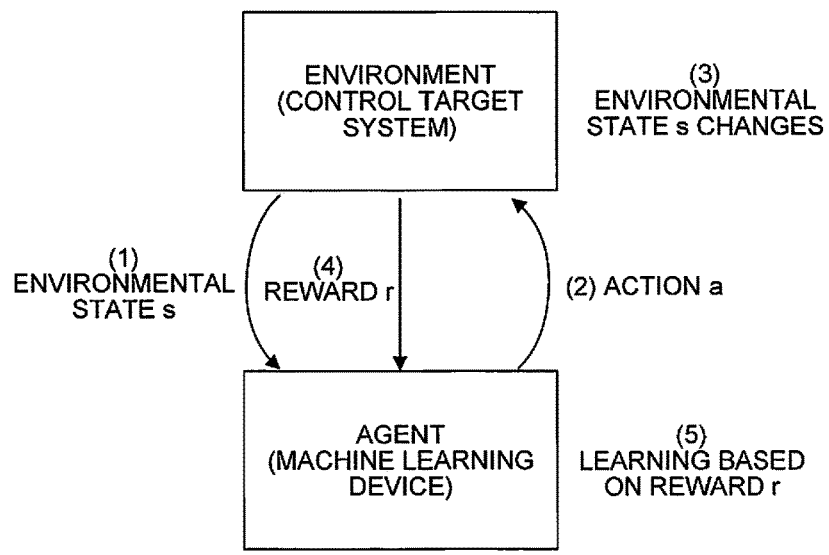
FIG. 1 is a diagram for describing the basic concept of a reinforcement learning algorithm.

FIG. 1 is a diagram for describing the basic concept of a reinforcement learning algorithm.

In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at certain time.

(2) The agent selects and performs an action $a_t$ that he/she is allowed to take based on an observation result and past learning.

(3) The environmental state $s_t$ changes to a next state $s_{t+1}$ after the action $a_t$ is performed.

(4) The agent accepts a reward $r_{t+1}$ based on the state change as a result of the action $a_t$.

(5) The interactions between the agent and the environment are performed in which the agent advances the learning based on the state $s_t$, the action $a_t$, the reward $r_{t+1}$, and a past learning result.

In the learning of the above (5), the agent acquires the mapping of an observed state $s_t$, an action $a_t$, and a reward $r_{t+1}$ as reference information for determining an amount of a reward that he/she is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a current state or action is valuable based on the above acquired mapping, the agent updates the value function (evaluation function) while repeatedly performing actions to learn an optimum action corresponding to the state.

A state value function is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions.

The update formula of the state value function is defined according to a reinforcement learning algorithm. For example, in TD (Temporal-Difference) learning indicating as one of reinforcement learning algorithms, the state value function is defined by the following formula (1). Note that in the following formula (1), α indicates a learning coefficient, γ indicates a discount rate, and $0<\alpha \leq 1$ and $0<\gamma \leq 1$ are established.

$$V(s_t) \leftarrow V(s_t) + \alpha[r_{t+1} + \gamma V(s_{t+1}) - V(s_t)]$$

In addition, an action value function is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is defined by the following formula (2). Note that in the following formula (2), a indicates a learning coefficient, γ indicates a discount rate, and $0<\alpha \leq 1$ and $0<\gamma \leq 1$ are established.

$$Q(s_t, a_t) \leftarrow Q(s_t, a_t) + \alpha \left( r_{t+1} + \gamma \max_{a} Q(s_{t+1}, a) - Q(s_t, a_t) \right) \quad (2)$$

Note that as a method for storing a value function (evaluation function) as a learning result, a method using a supervised learning device such as a SVM (Support Vector Machine) and a neural network of a multiple-value output that inputs a state $s_t$ and an action $a_t$ and outputs a value (evaluation), for example, in case where the state s takes many states, or the like is available besides a method using an approximate function and a method using an arrangement.

Further, in the selection of an action in the above (2), an action $a_t$ by which a reward $(r_{t+1} + r_{t+2} + \ldots)$ over a future becomes maximum in a current state $s_t$ (an action for changing to a most valuable state in a case where a state value function is used or a most valuable action in a case where an action value function is used) is selected using a value function (evaluation function) generated by past learning. Note that during learning, an agent may effectively select a random action with a constant probability for the purpose of advancing the learning in the selection of an action in the above (2) (ε-greedy method).

As described above, learning is advanced by repeatedly performing the above (1) to (5). Even in a new environment after the completion of learning in a certain environment, the learning may be advanced so as to be adapted to the new environment by additional learning. Accordingly, applying the aforementioned agent learning and action to the determination of machining conditions for machining a workpiece by using a machining apparatus as in the present invention, it becomes possible to adjust appropriate machining conditions in a short period of time when machining the workpiece based on new design data, by performing an additional learning in which the new design data is used as a new environment based on the past learning of the adjustment of machining conditions.

In addition, reinforcement learning employs a system in which a plurality of agents are connected to leach other via a network or the like, and information on states s, actions a, rewards r, or the like is shared between the agents and applied to each learning, whereby each of the agents performs dispersed reinforcement learning in consideration of the environments of the other agents to be allowed to perform efficient learning. Also in the present invention, when a plurality of agents (machine learning devices) controlling a plurality of environments (machining apparatuses acting as control targets) performs dispersed machine learning in a state of being connected to each other via a network or the like, the machining apparatuses are allowed to efficiently learn the adjustment of machining conditions for machining a workpiece.

Note that although various methods such as Q-learning, an SARSA method, TD learning, and an AC method have been commonly known as reinforcement learning algorithms, any of the above reinforcement learning algorithms may be applied to the present invention. Note that since each of the reinforcement learning algorithms has been commonly known, its detailed description will be omitted in the specification.

Hereinafter, a description will be given, based on a specific embodiment, of the machining apparatus of the present invention into which a machine learning device is introduced.

(2) Embodiment

Figure 2:
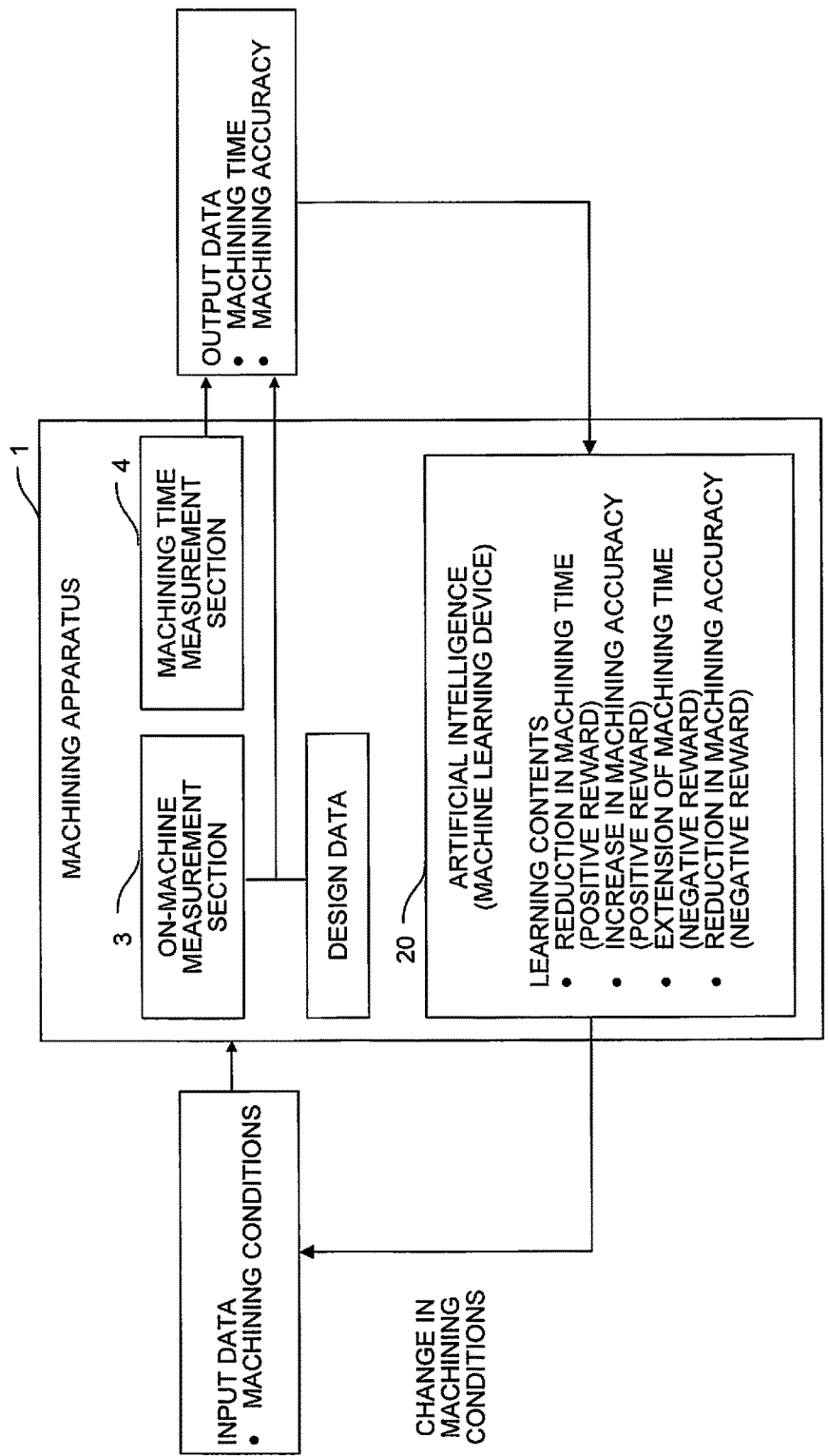
FIG. 2 is an image diagram regarding the machine learning of a machining apparatus according to an embodiment of the present invention.

FIG. 2 is a diagram showing an image regarding the machine learning of the adjustment of machining conditions in a machining apparatus into which a machine learning device acting as artificial intelligence according to an embodiment of the present invention is introduced. Note that FIG. 2 shows only configurations necessary for describing the machine learning by the machining apparatus according to the embodiment.

In the embodiment, "machining accuracy" and "machining time" each indicating output data on the machining apparatus are input to a machine learning device 20 as information for causing the machine learning device to specify an environment (a state $s_t$ in "(1) Machine Learning" described above). The "machining time" is a value measured by a machining time measurement section 4 of a machining apparatus 1. The "machining accuracy" is a value calculated based on a machining shape of a machined workpiece measured by an on-machine measurement section 3 of a machining apparatus 1 and design data generated by CAD (Computer-Aided Design) or the like (data indicating a machining shape of a targeted machined workpiece) (the error between the machining shape indicated by the design data and the machining shape of the machined workpiece).

The machining apparatus 1 according to the embodiment is provided with the on-machine measurement section 3 and allowed to measure a machining shape of a workpiece in a state of being fixed to the machining apparatus 1. The machining apparatus 1 compares a machining shape of a workpiece indicated by design data with a machining shape of a machined workpiece measured by the on-machine measurement section 3 to calculate data regarding machining accuracy.

Figure 3:
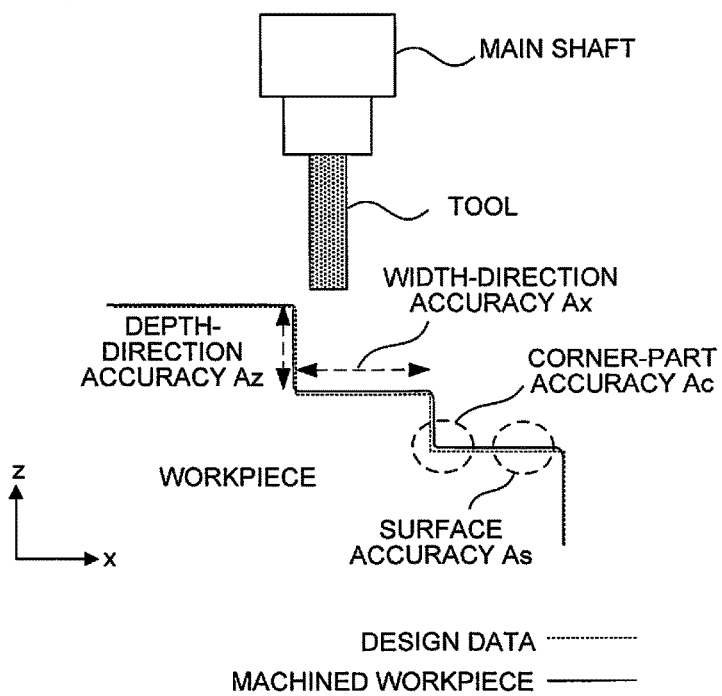
FIG. 3 is a diagram for describing each data handled in the embodiment of the present invention.

FIG. 3 is a diagram showing an example of data regarding machining accuracy according to the embodiment.

Examples of the types of data regarding machining accuracy include depth-direction accuracy $A_z$ indicating the error between a length in a depth direction (Z-axis direction) in design data and a length in the depth direction in a machined workpiece at a step part of each workpiece, width-direction accuracy $A_x$ indicating the error between a length in a width direction (X-axis direction) in the design data and a length in the width direction in the machined workpiece at a step of each workpiece, corner-part accuracy $A_c$ indicating the error between the design data and the machined workpiece (a difference in volume at a part near a corner) caused by an inward turning error at a corner part of each workpiece or the like, and surface accuracy $A_s$ indicating the error between the design data and the machined workpiece (a difference in volume at a part near a surface) caused by the finishing roughness, distortion, or the like of a machining surface at each machining surface.

Each of data items described above indicating machining accuracy may be calculated for each part of a workpiece, and then each calculated value may be used as a parameter for causing the machine learning device 20 to determine a state. Alternatively, a value obtained by adding up the absolute value of machining accuracy calculated for each part of a workpiece for each type of machining accuracy such as depth-direction accuracy and width-direction accuracy (for example, $|A_{z1}|A_{z2}|$ is calculated as depth-direction accuracy when the depth-direction accuracy at two step shapes on a workpiece in FIG. 3 is indicated by $A_{z1}$ and $A_{z2}$) may be used as a parameter for causing the machine learning device 20 to determine a state.

Note that the data regarding the machining accuracy shown in FIG. 3 is only an example, and other methods for expressing the machining accuracy may be employed. In addition, the types of data regarding machining accuracy corresponding to a machining type, a machining target, or the like may be appropriately set. For example, thread-groove depth accuracy may be employed for thread-cutting machining.

In the embodiment, the machine learning device 20 outputs adjustment amounts of machining conditions to be input to the machining apparatus 1 to an environment (actions $a_t$ in "(1) Machine Learning" described above). Examples of the machining conditions include a feed speed, a main-shaft revolution speed, table feed, and feed per tooth.

Moreover, in the embodiment, machining time and machining accuracy data are used as rewards given to the machine learning device 20 (rewards $r_t$ in "(1) Machine Learning" described above). In the calculation of a reward, the reward is set to have a greater positive value as machining time is shorter relative to a prescribed reference value, and set to have a greater negative value as the machining time is longer relative to the prescribed reference value. In addition, the reward is set to have a greater positive value as machining accuracy data is closer to zero relative to a prescribed reference value, and set to have a greater negative value as the machining accuracy data is greater than the prescribed reference value. The prescribed reference values of machining time and machining accuracy data may be obtained from data regarding machining time and machining accuracy measured when a workpiece is machined with the machining conditions of the machining apparatus 1 as initially set.

Note that an operator may appropriately set as to which data is used to determine rewards according to the contents of the machining of a workpiece in the machining apparatus 1.

In addition, in the embodiment, the machine learning device 20 performs machine learning based on the state, action, and reward described above. In the machine learning, a state $s_t$ is defined by the combination of input data at certain time t, a change in machining conditions performed with respect to the defined state $S_t$ is equivalent to an action $a_t$, and a value evaluated and calculated based on input data newly obtained as a result of the change in the machining conditions due to the action $a_t$ is equivalent to a reward $r_{t+1}$. As in "(1) Machine Learning" described above, the state $s_t$, the action $a_t$, and the reward $r_{t+1}$ are applied to the update formula of a value function (evaluation function) corresponding to a machine-learning algorithm to advance the learning.

Hereinafter, a description will be given, with reference to the function block diagram of FIG. 4, of the machining apparatus according to the embodiment of the present invention.

The machining apparatus 1 is provided with a driving section (not shown) such as a servo motor that drives each shaft to machine components, a servo control section (not shown) that controls the servo motor, peripheral equipment (not shown), a control section 2 that controls the driving section and the peripheral equipment, an on-machine measurement section 3 that measures a machining shape of a workpiece machined by the machining apparatus 1 on-machine, a machining time measurement section 4 that measures machining time necessary for machining a workpiece, and a machine learning device 20 acting as artificial intelligence that performs machine learning.

Figure 4:
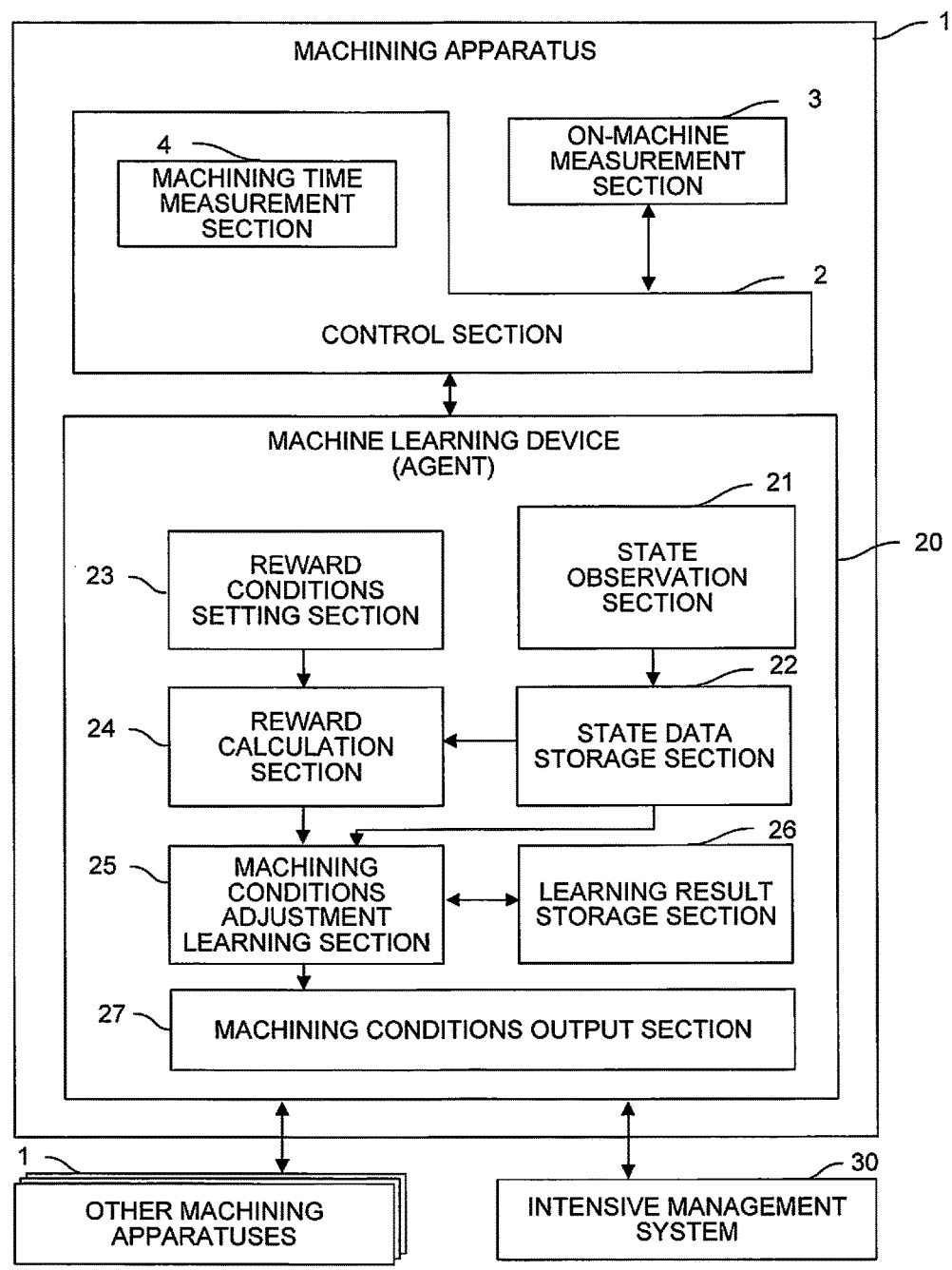
FIG. 4 is a function block diagram of the machining apparatus according to the embodiment of the present invention.

When the configurations of the machining apparatus shown in FIG. 4 are compared with the elements of the reinforcement learning algorithm shown in FIG. 1, an entirety including the driving section such as a servo motor and the servo control section (each not shown), the peripheral equipment (not shown), the control section 2, or the like normally provided in the machining apparatus 1 of FIG. 4 corresponds to the "environment" in the reinforcement learning algorithm of FIG. 1. In addition, the machine learning device 20 of the machining apparatus 1 of FIG. 4 corresponds to the "agent" in the reinforcement learning algorithm of FIG. 1.

The control section 2 analyzes a program read from a memory (not shown) or input via input equipment (not shown) to control each section of the machining apparatus 1. In the control section 2, machining conditions used to machine a workpiece and design data indicating a machining shape of the workpiece machined according to the program are stored in the memory in advance.

The on-machine measurement section 3 has the function of measuring a machining shape of a workpiece machined by the machining apparatus 1 on-machine, is constituted by, for example, a laser measurement device, a magnetic measurement device, or the like, and measures the machining shape of the workpiece in a state of being fixed to the machining apparatus 1. The measured machining shape of the workpiece is input to the control section 2. Then, the machining accuracy of the machining shape of the machined workpiece is calculated based on the machining shape of the machined workpiece input from the on-machine measurement section 3 and design data indicating a target machining shape of the workpiece stored in the memory (not shown). The machining accuracy is calculated for each portion of the workpiece.

The machining time measurement section 4 measures machining time necessary for machining a workpiece with the machining apparatus 1. For example, the machining time measurement section 4 measures time until a machining program ends since its activation using the clocking function or the like of the control section 2, and sets the measured time as machining time.

Then, the measured machining time and the calculated machining accuracy are used for calculating rewards in the learning of the machine learning device 20.

As shown in FIG. 4, the machine learning device 20 that performs machine learning is provided with a state observation section 21, a state data storage section 22, a reward conditions setting section 23, a reward calculation section 24, a machining conditions adjustment learning section 25, a learning result storage section 26, and a machining conditions output section 27. The machine learning device 20 may be provided inside the machining apparatus 1, or may be provided in a personal computer or the like outside the machining apparatus 1.

The state observation section 21 observes state data regarding the machining apparatus 1 via the control section 2 and acquires the observed state data in the machine learning device 20. The observed state data includes data on machining time and machining accuracy described above, or the like.

The state data storage section 22 receives and stores state data and outputs the stored state data to the reward calculation section 24 and the machining conditions adjustment learning section 25. The state data input to the state data storage section 22 may be data acquired by the latest machining operation or data acquired by a past machining operation. In addition, it is also possible for the state data storage section 22 to receive and store state data stored in other machining apparatuses 1 or an intensive management system 30, and it is possible for the state data storage section 22 to output state data stored in the state data storage section 22 to other machining apparatuses 1 or an intensive management system 30.

The reward conditions setting section 23 sets conditions for giving rewards in machine learning. Positive and negative rewards are given and may be appropriately set. In addition, an input to the reward conditions setting section 23 may be performed via a personal computer, a tablet terminal, or the like used in the intensive management system 30. However, with an input via the MDI (Manual Data Input) equipment (not shown) of the machining apparatus 1, it becomes possible to perform easier settings.

The reward calculation section 24 analyzes state data input from the state observation section 21 or the state data storage section 22 based on conditions set by the reward conditions setting section 23, and outputs calculated rewards to the machining conditions adjustment learning section 25.

Hereinafter, a description will be given of an example of reward conditions set by the reward conditions setting section 23 according to the embodiment.

(Reward 1: Reduction in Machining time (Positive Reward and Negative Reward))

Since the cycle time of component machining increases with reduction in machining time necessary for machining a workpiece, a positive reward is given according to the degree of reduction. In the calculation of a reward, the reward is set to have a greater positive value as "machining time is shorter relative to a prescribed reference value," and set to have a greater negative value as the "machining time is longer relative to the prescribed reference value." "The prescribed reference value of the machining time" may be based on machining time measured when a workpiece is machined with the machining conditions of the machining apparatus 1 as initially set.

(Reward 2: Increase in Machining accuracy (Positive Reward and Negative Reward))

When the machining accuracy of the machining shape of a machined workpiece with respect to a target machining shape of the workpiece indicated by design data is high, a positive reward is given according to the degree of height. A reward based on machining accuracy may be calculated for each type of the machining accuracy as described above. In the calculation of a reward, the reward is set to have a greater positive value as machining accuracy data is closer to zero relative to a prescribed reference value, and set to have a greater negative value as the machining accuracy data is greater than the prescribed reference value. "The prescribed reference value" of the machining accuracy data may be based on machining accuracy data measured when a workpiece is machined with the machining conditions of the machining apparatus 1 as initially set.

Note that a reward obtained by machining time and a reward obtained by machining accuracy may be weighted according to their importance. Thus, learning in which machining conditions are adjusted with an emphasis placed on machining time or learning in which machining conditions are adjusted with an emphasis placed on machining accuracy is allowed.

In addition, when there is a plurality of data items regarding machining accuracy as described above, each of the data items regarding the machining accuracy may be weighted. Thus, learning in which an emphasis is placed on depth-direction accuracy or learning in which an emphasis is placed on corner-part accuracy is allowed.

Referring back to FIG. 4, the machining conditions adjustment learning section 25 performs, every time the machining of a workpiece by the machining apparatus 1 is completed, machine learning (reinforcement learning) based on state data, an adjustment result of the machining conditions of the machining apparatus 1 performed by the machining conditions adjustment learning section 25 itself, and rewards calculated by the reward calculation section 24. In addition, the machining conditions adjustment learning section 25 adjusts machining conditions for machining the workpiece by the machining apparatus 1 based on a past learning result and current state data. Here, the adjustment of the machining conditions corresponds to the "action a" in the reinforcement learning algorithm of FIG. 1.

For example, in the adjustment of the machining conditions, it may be possible that each of the combinations of the machining conditions to be adjusted and adjustment amounts of the machining conditions is defined in advance as a selectable "action" and an "action" by which a maximum reward will be obtained in the future based on a past learning result is selected. In addition, it may be possible that an ϵ-greedy method described above is employed and a random "action" is selected with a prescribed probability to advance learning.

Here, in the machine learning performed by the machining conditions adjustment learning section 25, a state $s_t$ is defined by the combination of state data at certain time t, and the adjustment of machining conditions according to the defined state $s_t$ and the output of an adjustment result from the machining conditions output section 27 that will be described later are equivalent to an action $a_t$. Then, a value calculated by the reward calculation section 24 based on state data obtained as a result of machining a workpiece by the machining apparatus 1 according to the adjustment result is equivalent to a reward $r_{t+1}$. A value function used in the learning is determined according to an applied learning algorithm. For example, when Q-learning is used, it is only necessary to update an action value function $Q(s_t, a_t)$ according to the above formula (2) to advance the learning.

The learning result storage section 26 stores a learning result of the machining conditions adjustment learning section 25. Further, when a learning result is used by the machining conditions adjustment learning section 25 again, the learning result storage section 26 outputs a stored learning result to the machining conditions adjustment learning section 25. As described above, a learning result may be stored in such a way that a value function corresponding to a machine learning algorithm to be used is stored in a supervised learning device such as a SVM and a neural network of an approximate function, an arrangement, or a multiple-value output, or the like.

Note that it is also possible for the learning result storage section 26 to receive and store a learning result stored in other machining machines 1 or the intensive management system 30, and it is also possible for the learning result storage section 26 to output a learning result stored in the learning result storage section 26 to other machining machines 1 or the intensive management system 30.

The machining conditions output section 27 outputs an adjustment result of machining conditions by the machining conditions adjustment learning section 25 to the control section 2. The control section 2 controls the machining apparatus 1 based on the machining conditions output from the machining conditions output section 27 to machine a workpiece.

Then, after the completion of the machining, state data is acquired by the machine learning device 20 again, and learning is repeatedly performed using the input state data. Thus, the acquisition of a more excellent learning result is allowed.

When the machining apparatus 1 actually performs machining using learning data for which learning has been completed, the machining may be repeatedly performed using the learning data acquired when the learning has been completed, not causing the machine learning device 20 to perform new learning.

In addition, the machine learning device 20 that has completed learning (or the machine learning device 20 in which completed learning data on other machine learning devices 20 has been copied in the learning result storage section 26) may be attached to other machining apparatuses 1 to perform a repetitive operation using the learning data for which the learning has been completed as it is.

Moreover, it is possible to attach the machine learning device 20 that has completed learning to another machining apparatus 1 with the learning function of the machine learning device 20 kept valid so that the other machining apparatus 1 can continue machining of a workpiece. In that case, it is possible for the other machining apparatus 1 to perform machining operation by causing the attached machine learning device 20 to further learn an individual difference, a secular change, or the like that is peculiar to the other machining apparatus 1, and searching for better machining conditions for the machining apparatus 1.

The machining apparatus 1 may perform machine learning alone. However, when each of a plurality of machining apparatuses 1 is further provided with a section used to communicate with an outside, it becomes possible to send/ receive and share state data stored in each of the state data storage sections 22 and a learning result stored in the learning result storage sections 26. Thus, more efficient machine learning is allowed. For example, when learning is performed with machining conditions fluctuating within a prescribed range, the learning is advanced in parallel between a plurality of machining apparatuses 1 in such a way that state data and learning data are exchanged between the machining apparatuses 1 while a workpiece is machined with different machining conditions fluctuating within a prescribed range. Thus, efficient learning is allowed.

In order to exchange state data and learning data between a plurality of machining apparatuses 1 as described above, communication may be performed via a host computer such as the intensive management system 30, the machining apparatuses 1 may directly communicate with each other, or a cloud may be used. However, for handling large amounts of data, a communication section with a faster communication speed is preferably provided.

In addition, an unnecessary portion of a workpiece is preliminary machined instead of directly machining a product portion. That is, when a product portion is machined after machine learning has been partly completed, it is possible to obtain a machining shape having high accuracy to some degree from the beginning.

The embodiment of the present invention is described above. However, the present invention is not limited only to the example of the above embodiment and may be carried out in various aspects with appropriate modifications.

The invention claimed is:

1. A machining apparatus, comprising:
   an on-machine measurement section configured to measure a machining shape of a workpiece on-machine;
   a machining time measurement section configured to measure machining time of the workpiece; and
   a machine learning device configured to perform machine learning based on inputs of (i) the machining time and (ii) machining accuracy between the machining shape and design data of the workpiece, wherein
   the machine learning device is configured to change and output a machining condition based on a result of the machine learning such that the machining accuracy increases and the machining time becomes as short as possible in a range where the machining accuracy is maintained,
   the machining apparatus is configured to perform machining of a workpiece in accordance with the machining condition output by the machine learning device, and
   the machine learning device is configured to perform the machine learning based on a machining accuracy and a machining time that are obtained as a result of the machining of the workpiece by the machining apparatus in accordance with the machining condition output by the machine learning device.

2. The machining apparatus according to claim 1, wherein the machine learning device is configured to perform the machine learning in such a way that
   a positive reward is given when the machining apparatus machines the workpiece such that an error between the machining shape and the design data of the workpiece is reduced or when the machining time is reduced, and
   a negative reward is given when the machining apparatus machines the workpiece such that the error between the machining shape and the design data of the workpiece is increased or when the machining time is increased.

3. The machining apparatus according to claim 1, wherein the machine learning device is configured to perform, in the machine learning, weighting to indicate which of (i) reduction in an error between the machining shape and the design data of the workpiece and (ii) reduction in the machining time is to be emphasized.

4. The machining apparatus according to claim 1, wherein the machining apparatus is connectable to at least one another machining apparatus and configured to mutually exchange or share the result of the machine learning with the at least one another machining apparatus.

5. A machine learning device for performing machine learning of an adjustment of a machining condition in machining of a workpiece by a machining apparatus, the machine learning device comprising:
   a learning result storage section configured to store a result of the machine learning of the adjustment of the machining condition;
   a state observation section configured to acquire state data including at least machining time, machining accuracy of the workpiece, and the machining condition in the machining of the workpiece by the machining apparatus;
   a machining condition adjustment learning section configured to adjust the machining condition based on the result of the machine learning of the adjustment of the machining condition and the state data acquired by the state observation section; and
   a machining condition output section configured to output the machining condition adjusted by the machining condition adjustment learning section, wherein
   the machining apparatus is configured to perform machining of a workpiece in accordance with the machining condition output by the machining condition output section, and
   the machine learning device is configured to perform the machine learning based on a machining accuracy and a machining time that are obtained as a result of the machining of the workpiece by the machining apparatus in accordance with the machining condition output by the machining condition output section.

6. A system, comprising:
   a plurality of machining apparatuses each as defined in claim 1, wherein
   the plurality of machining apparatuses respectively includes a plurality of machine learning devices, and
   the plurality of machine learning devices is connected to each other via a network, and configured to
      control the plurality of machining apparatuses, respectively, and
      perform dispersed machine learning in a state where the plurality of machine learning devices is connected to each other via the network.

7. A system, comprising:
   a plurality of machine learning devices each as defined in claim 5; and
   a plurality of machining apparatuses, wherein
   the plurality of machine learning devices is connected to each other via a network, and configured to
      control the plurality of machining apparatuses, respectively, and
      perform dispersed machine learning in a state where the plurality of machine learning devices is connected to each other via the network.

* * * * *